US010620869B2

(12) United States Patent
Nakashima

(10) Patent No.: US 10,620,869 B2
(45) Date of Patent: Apr. 14, 2020

(54) STORAGE CONTROL DEVICE, STORAGE CONTROL METHOD, AND RECORDING MEDIUM

(71) Applicant: NEC Corporation, Minato-ku, Tokyo (JP)

(72) Inventor: Toshitaka Nakashima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 118 days.

(21) Appl. No.: 15/440,375

(22) Filed: Feb. 23, 2017

(65) Prior Publication Data
US 2017/0255392 A1 Sep. 7, 2017

(30) Foreign Application Priority Data

Mar. 4, 2016 (JP) ................. 2016-042479

(51) Int. Cl.
G06F 12/00 (2006.01)
G06F 12/08 (2016.01)
G06F 13/00 (2006.01)
G06F 3/06 (2006.01)

(52) U.S. Cl.
CPC ............ *G06F 3/065* (2013.01); *G06F 3/0604* (2013.01); *G06F 3/0673* (2013.01)

(58) Field of Classification Search
CPC .............................. G06F 3/065; G06F 3/0673
USPC ......................................................... 711/165
See application file for complete search history.

(56) References Cited

U.S. PATENT DOCUMENTS

| 5,761,704 | A | 6/1998 | Sasaki | |
|---|---|---|---|---|
| 7,275,177 | B2 * | 9/2007 | Armangau | G06F 11/2074 707/999.202 |
| 7,334,095 | B1 * | 2/2008 | Fair | G06F 3/0607 711/161 |
| 8,151,263 | B1 * | 4/2012 | Venkitachalam | G06F 9/485 711/162 |
| 8,380,674 | B1 * | 2/2013 | Bolen | G06F 3/0617 707/657 |

(Continued)

FOREIGN PATENT DOCUMENTS

JP H07-84847 A 3/1995
JP H08-297917 A 11/1996

(Continued)

OTHER PUBLICATIONS

Japanese Office Action for JP Application No. 2016-042479 dated May 8, 2018 with English Translation.

*Primary Examiner* — Mohamed M Gebril

(57) ABSTRACT

A storage control device according to the present invention connected to a master disk device that stores data into a plurality of segments continuously, and a plurality of copy disk devices that are copy destinations of the data, the storage control device includes: a clone processing unit that, when receiving a copy instruction for one of the copy disk devices, repeats reading and writing of each of the segments in order of address to complete copy, and that, when a first copy disk that is the copy disk device other than a later copy disk that is the specified copy disk device is during copy when receiving the copy instruction, starts copy of the later copy disk from the segment during reading, and, after the completion of reading data of the segment, performs writing into both the first copy disk and the later copy disk.

3 Claims, 10 Drawing Sheets

(56) References Cited

U.S. PATENT DOCUMENTS

| | | | |
|---|---|---|---|
| 8,484,164 B1* | 7/2013 | Sivakumar | G06F 3/0611 707/657 |
| 9,569,124 B2* | 2/2017 | Jain | H04L 43/0817 |
| 9,785,523 B2* | 10/2017 | Chiruvolu | G06F 11/2038 |
| 9,983,806 B2* | 5/2018 | Ayukawa | G06F 3/061 |
| 10,042,711 B1* | 8/2018 | Chopra | G06F 11/1448 |
| 10,042,908 B2* | 8/2018 | Kuchibhotla | G06F 16/27 |
| 10,067,722 B2* | 9/2018 | Lakshman | G06F 3/0631 |
| 2002/0007417 A1* | 1/2002 | Taylor | G06F 3/0613 709/231 |
| 2003/0007079 A1* | 1/2003 | Sisselman | H04N 5/772 348/231.99 |
| 2003/0014520 A1* | 1/2003 | Rinaldis | G06F 11/2069 709/225 |
| 2003/0131068 A1 | 7/2003 | Hoshino et al. | |
| 2004/0037302 A1* | 2/2004 | Varma | H04L 49/90 370/412 |
| 2006/0059306 A1* | 3/2006 | Tseng | G06F 3/0607 711/114 |
| 2006/0107101 A1* | 5/2006 | Soeda | G06F 11/1076 714/6.2 |
| 2007/0239944 A1* | 10/2007 | Rupanagunta | G06F 3/0613 711/147 |
| 2008/0244028 A1* | 10/2008 | Le | G06F 3/0607 709/208 |
| 2009/0164409 A1* | 6/2009 | Mukherjee | G06F 16/13 |
| 2010/0049918 A1* | 2/2010 | Noguchi | G06F 3/0613 711/114 |
| 2010/0153617 A1* | 6/2010 | Miroshnichenko | G06F 3/061 711/6 |
| 2010/0199126 A1* | 8/2010 | Noguchi | G06F 11/1076 714/6.12 |
| 2010/0205482 A1* | 8/2010 | Kaneko | G06F 11/2069 714/6.12 |
| 2010/0228919 A1* | 9/2010 | Stabrawa | G06F 11/1456 711/120 |
| 2011/0154331 A1* | 6/2011 | Ciano | G06F 9/45558 718/1 |
| 2011/0179415 A1* | 7/2011 | Donnellan | G06F 9/45558 718/1 |
| 2012/0084775 A1* | 4/2012 | Lotlikar | G06F 9/45558 718/1 |
| 2012/0272240 A1* | 10/2012 | Starks | G06F 16/1805 718/1 |
| 2012/0278799 A1* | 11/2012 | Starks | G06F 9/455 718/1 |
| 2013/0054531 A1* | 2/2013 | Susairaj | G06F 16/217 707/640 |
| 2013/0332927 A1* | 12/2013 | Tang | G06F 9/45545 718/1 |
| 2014/0229936 A1* | 8/2014 | Gaonkar | G06F 9/45558 718/1 |
| 2014/0324793 A1* | 10/2014 | Glazemakers | G06F 3/0641 707/692 |
| 2015/0066859 A1* | 3/2015 | Blake | G06F 11/1438 707/649 |
| 2015/0067168 A1 | 3/2015 | Hegdal et al. | |
| 2015/0127833 A1* | 5/2015 | Hegdal | G06F 9/5016 709/226 |
| 2015/0277952 A1* | 10/2015 | Lin | G06F 9/45558 711/114 |
| 2016/0018988 A1* | 1/2016 | Guyot | G11C 13/0004 711/102 |
| 2016/0034290 A1* | 2/2016 | Christenson | G06F 9/45558 718/1 |
| 2016/0098219 A1* | 4/2016 | Nakata | G06F 3/065 711/162 |
| 2016/0170788 A1* | 6/2016 | Tarasuk-Levin | G06F 9/45558 718/1 |
| 2016/0364160 A1* | 12/2016 | Oh | G06F 9/45558 |
| 2016/0378527 A1* | 12/2016 | Zamir | G06F 9/45558 711/162 |

FOREIGN PATENT DOCUMENTS

| | | |
|---|---|---|
| JP | 2003-208268 A | 7/2003 |
| JP | 2015-046159 A | 3/2015 |

* cited by examiner

_US 10,620,869 B2_

STORAGE CONTROL DEVICE, STORAGE CONTROL METHOD, AND RECORDING MEDIUM

This application is based upon and claims the benefit of priority from Japanese Patent Application No. 2016-042479, filed on Mar. 4, 2016, the disclosure of which is incorporated herein in its entirety by reference.

TECHNICAL FIELD

The present invention relates to a storage control device, a storage control method, and a recording medium, in particular, a storage control device, a storage control method, and a recording medium, which create a plurality of clone disks of a master disk.

BACKGROUND ART

Japanese Unexamined Patent Application Publication No. 2015-46159 discloses a system in which, after one virtual machine that becomes a master is created, a clone of the master virtual machine is created, and a plurality of new virtual machines are created, when using a plurality of virtual machines by using a virtual environment.

SUMMARY

The creation of the clone of the master virtual machine is performed by copying a logical disk that is a component of the virtual machine that becomes a master (hereinafter, master disk) into another logical disk, and constructing a new virtual machine by using the copied logical disk (hereinafter, clone disk). When creating a plurality of new virtual machines simultaneously, processing of creating the respective new virtual machines is executed a synchronously. Thus, the creation of the respective clone disks is performed separately and a synchronously.

Since data copies from one master disk into a plurality of clone disks are executed a synchronously, reading of all data of the master disk is performed each time when the clone disk creation is required. Thus, there is a problem in that, the load of the master disk is increased as the number of requests for the clone disk creation grows, and, as a result, it takes time to perform reading processing from the master disk, and processing time of the clone disk creation is lengthened.

This problem occurs when a plurality of clone disks are created from one master disk a synchronously without limitation to when the clone of the virtual machine is created. The disks may be logical disks or actual disks (physical disks).

It is an object of the present invention to provide a storage control device, a storage control method, and a recording medium, which solve the above-described problem.

A storage control device according one aspect of the present invention is connected to a master disk device that stores data into a plurality of segments continuously, and a plurality of copy disk devices that are copy destinations of the data. The storage control device includes: a clone processing unit that, when receiving a copy instruction for one of the copy disk devices, repeats reading and writing of each of the segments in order of address to complete copy, and that, when a first copy disk that is the copy disk device other than a later copy disk that is the specified copy disk device is during copy when receiving the copy instruction, starts copy of the later copy disk from the segment during reading, and, after the completion of reading data of the segment, performs writing into both the first copy disk and the later copy disk.

A storage control method according to one aspect of the present invention is a method of a storage control device. The storage control device is connected to a master disk device that stores data into a plurality of segments continuously, and a plurality of copy disk devices that are copy destinations of the data. The storage control method is performed by the storage control device. The storage control method includes: receiving a copy instruction for one of the copy disk devices, and repeating reading and writing of each of the segments in order of address to complete copy; and when a first copy disk that is the copy disk device other than a later copy disk that is the specified copy disk device is during copy when receiving the copy instruction, starting copy of the later copy disk from the segment during reading, and, after the completion of reading data of the segment, performing writing into both the first copy disk and the later copy disk.

A computer readable non-transitory recording medium according to one aspect of the present invention embodies a program. The program causes a computer to perform a method. The computer is connected to a master disk device that stores data into a plurality of segments continuously, and a plurality of copy disk devices that are copy destinations of the data. The method includes: receiving a copy instruction for one of the copy disk devices, and repeating reading and writing of each of the segments in order of address to complete copy, and, when a first copy disk that is the copy disk device other than a later copy disk that is the specified copy disk device is during copy when receiving the copy instruction, starting copy of the later copy disk from the segment during reading, and, after the completion of reading data of the segment, performing writing into both the first copy disk and the later copy disk.

BRIEF DESCRIPTION OF THE DRAWINGS

Exemplary features and advantages of the present invention will become apparent from the following detailed description when taken with the accompanying drawings in which.

EXEMPLARY EMBODIMENT

<First Example Embodiment>
<Outline>
A storage control device 10 according to the present example embodiment receives a plurality of data-copy-requests transmitted from a master disk device 20 into clone disk devices 21 a synchronously and continuously in a short period of time. When receiving the data-copy-request into each of the clone disk devices 21, the storage control device 10 stores an address where copying data into the clone disk device 21 specified by the data-copy-request is started (hereinafter, copy start address) in association with the clone disk device 21.

The storage control device 10 performs reading from the master disk device 20 sequentially, and performs writing into each of the clone disk devices 21 sequentially with the copy start address stored in association with the clone disk device 21 as a starting point.

Accordingly, the storage control device 10 reduces the data reading volume with respect to the master disk device 20, and shortens the data copy time into the clone disk devices 21.

Figure 1:
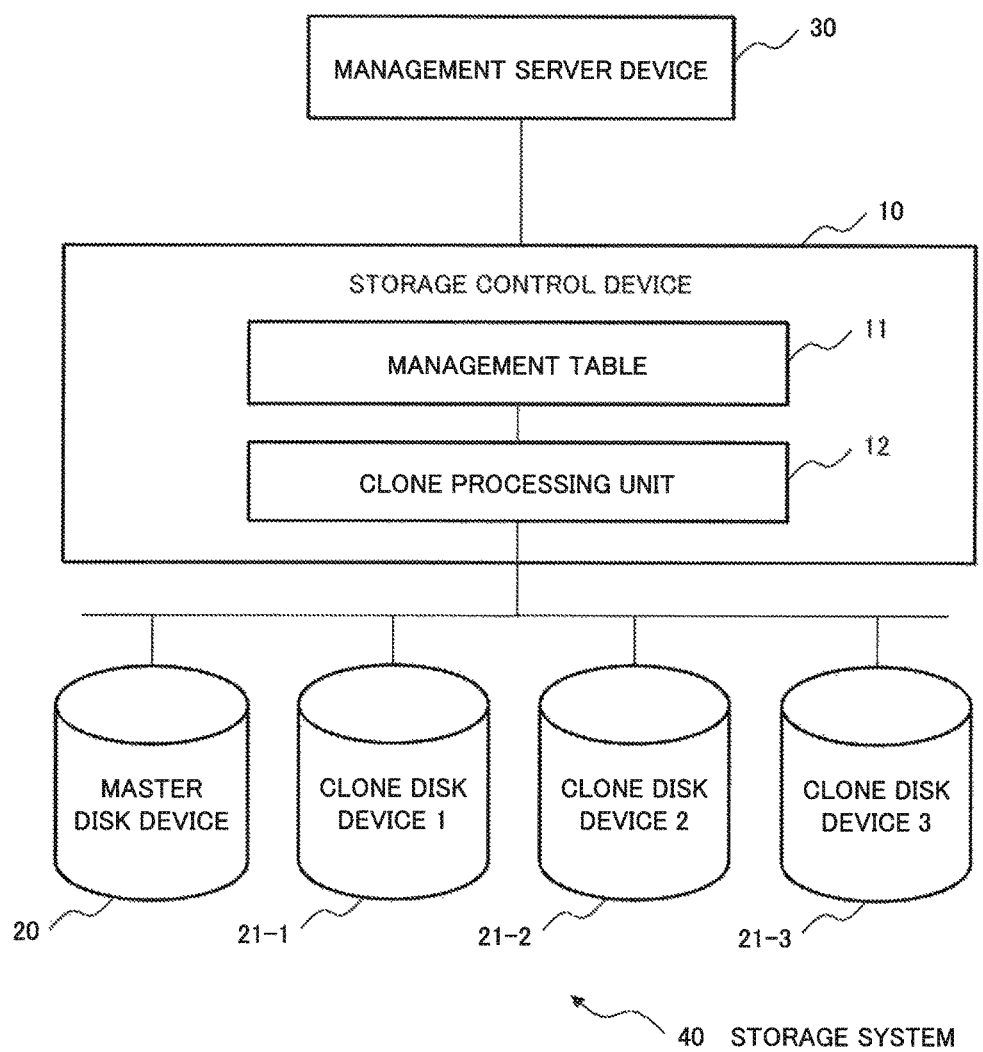
FIG. 1 is a configuration diagram of a storage system 40 according to a first example embodiment.

<Configuration>
FIG. 1 is a configuration diagram of a storage system 40 according to a first example embodiment. The storage system 40 includes the storage control device 10, the master disk device 20 connected to the device, the plurality of the clone disk devices 21, and a management server device 30.

The master disk device 20 and the clone disk devices 21 have similar in capacity. The master disk device 20 and the clone disk devices 21 may be physical disk devices, respectively, or logical disk devices provided in one physical disk device. In addition, three clone disk devices 21 are illustrated in FIG. 1, but the number of the clone disk devices 21 is not limited to three.

The master disk device 20 stores original data to be copied into the clone disk devices 21. The original data is composed of a plurality of pieces of segment data, for example, a plurality of blocks, and a segment ID (Identifier) is allocated to each of them. The segment ID is, for example, a segment sequence number, a segment initial address, or a segment final address.

Figure 5:
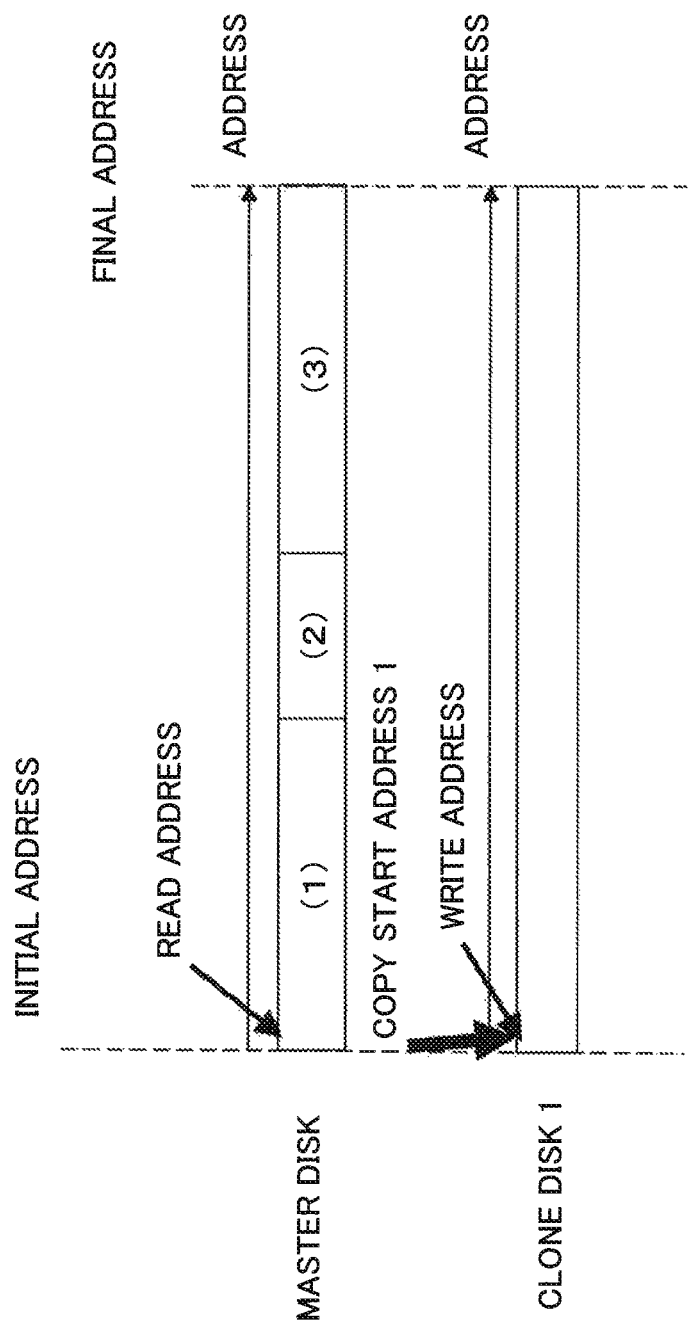
FIG. 5 is a diagram illustrating a process of executing copy with respect to three clone disk devices 21 (illustrated by clone disks 1, 2, and 3, respectively) (part 1)

The original data stored in the master disk device 20 is illustrated in the upper stage of FIG. 5. In the example of FIG. 5, the original data is composed of three segments denoted by (1), (2), and (3). The number of the segments is not limited to three.

In the present example embodiment, the segments are managed circularly. Here, the term circularly means that, for example, the segment (1) is followed by the segment (2) and then by the segment (3) to return to the segment (1).

In other words, the term circularly means that reading and writing of the segments are operated continuously in order of address such that the segment having the lowest address is targeted after the segment having the highest address.

The storage control device 10 includes a clone processing unit 12 and a management table 11.

The clone processing unit 12 receives a data-copy-request that targets any one of the clone disk devices 21 from the management server device 30, and executes copying data from the master disk device 20 into the specified clone disk device 21. The clone processing unit 12 can receive a plurality of data-copy-requests targeting the clone disk device 21 sequentially to execute copy thereof concurrently. The clone processing unit 12 controls the master disk device 20 such that reading data from the master disk device 20 is performed sequentially when executing the data copy.

As just described, the management server device 30 is one example of a management device.

The clone processing unit 12 is configured by a logic circuit. The clone processing unit 12 may be achieved by a program 53 that the storage control device 10 that is also a computer device 50 executes.

Figure 2:
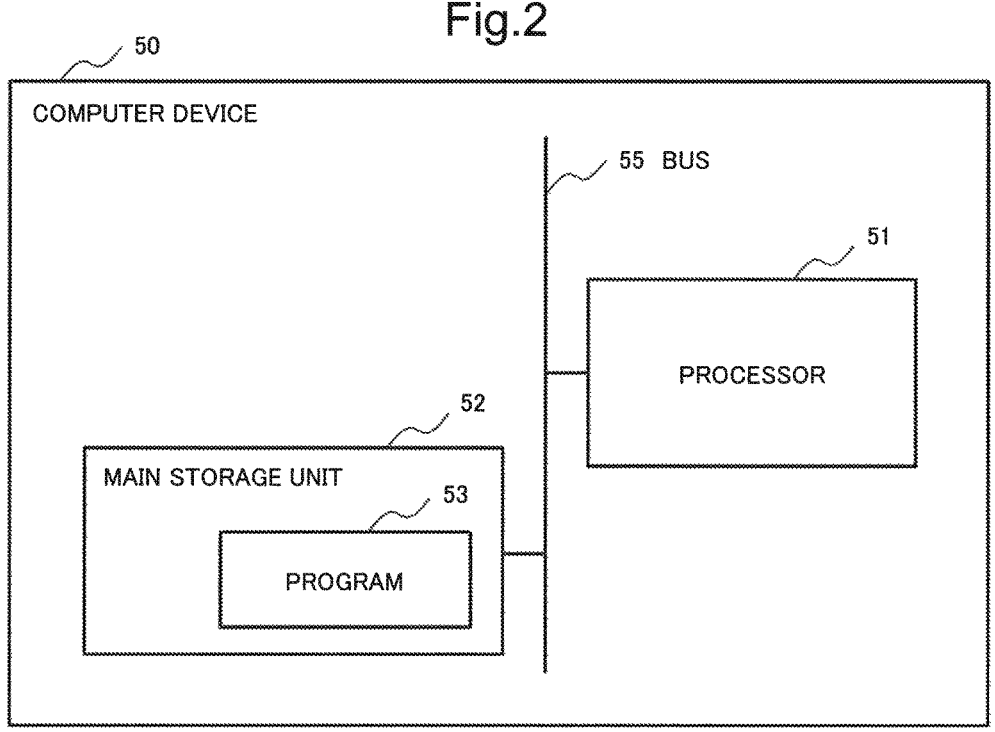
FIG. 2 is a configuration diagram of a computer device 50.

FIG. 2 is a configuration diagram of the computer device 50. The computer device 50 includes a processor 51 and a main storage unit 52 which are connected to each other with a bus 55. Here, the main storage unit 52 is, for example, a semiconductor storage device. The main storage unit 52 stores the program 53.

The semiconductor storage device is, for example, a flash Read Only Memory (ROM), a Solid State Drive (SSD), or a Random Access Memory (RAM). That is, the main storage unit 52 is a computer-readable non-transitory recording medium and/or transitory recording medium.

The program 53 is executed by the processor 51 to make the processor 51 function as the clone processing unit 12.

Figure 3:
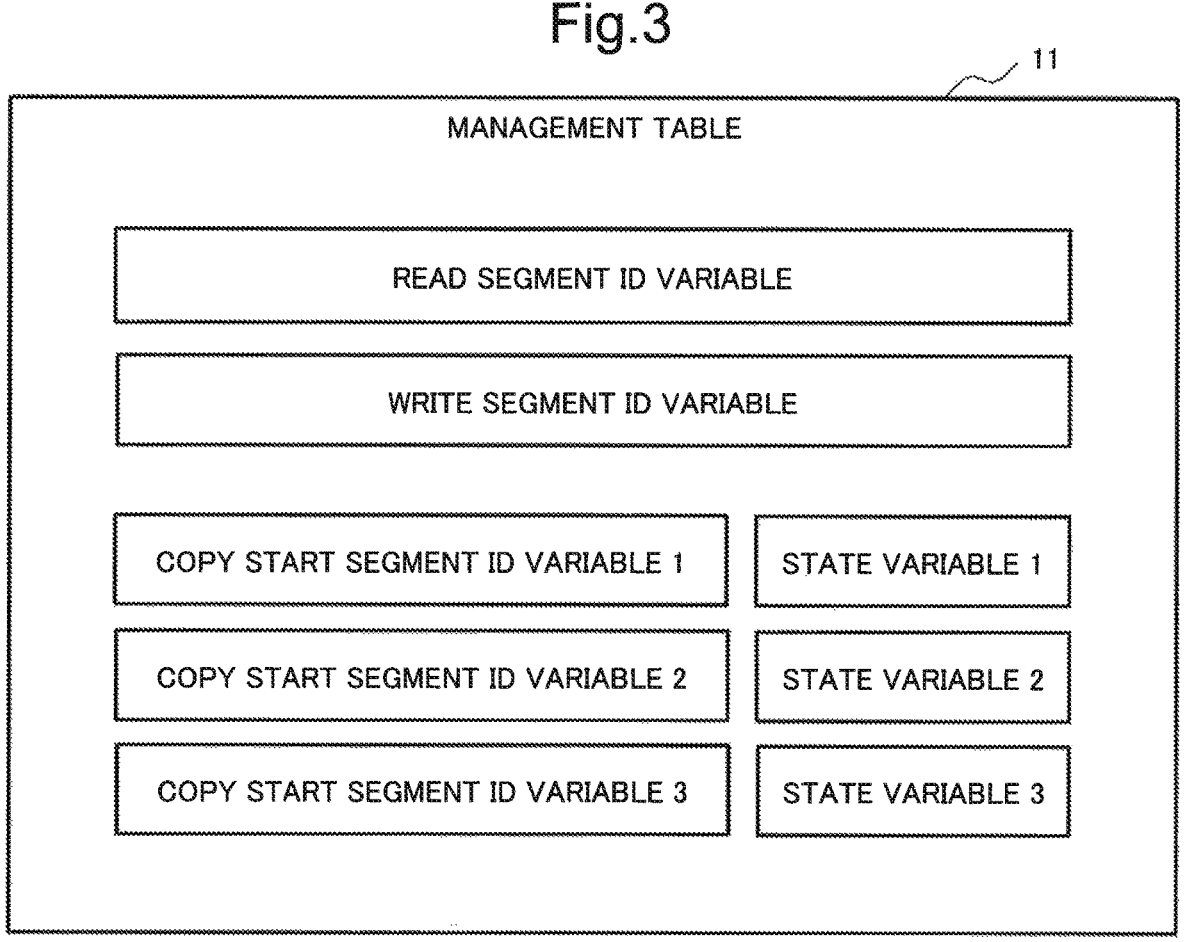
FIG. 3 is a configuration diagram of data stored in a management table 11.

FIG. 3 is a configuration diagram of data stored in the management table 11. The management table 11 stores a read segment ID variable, a write segment ID variable, and copy start segment ID variables and state variables which are provided in association with the respective clone disk devices 21.

The read segment ID variable stores a segment ID of a segment during reading, during reading data from the master disk device 20 in a copy progressing process. The read segment ID variable is advanced (added) when reading of the segment data is completed.

The write segment ID variable stores a segment ID of a segment during writing, during writing data into the clone disk device 21 in the copy progressing process. The write segment ID variable is advanced (added) when writing of the segment data is completed. In both the read segment ID variable and the write segment ID variable, an initial value is, for example, the segment ID of the initial segment of the original data.

The state variable indicates a state in a copy process of the associated clone disk device 21. There are three types of states: not targeted (initial value); waiting for processing; and during processing.

The copy start segment ID variable stores a segment ID of a segment where copy of the associated clone disk device 21 is started.

The management table 11 is stored in a storage region of the storage control device 10. The management table 11 is stored in, for example, the main storage unit 52 of the computer device 50.

Figure 4:
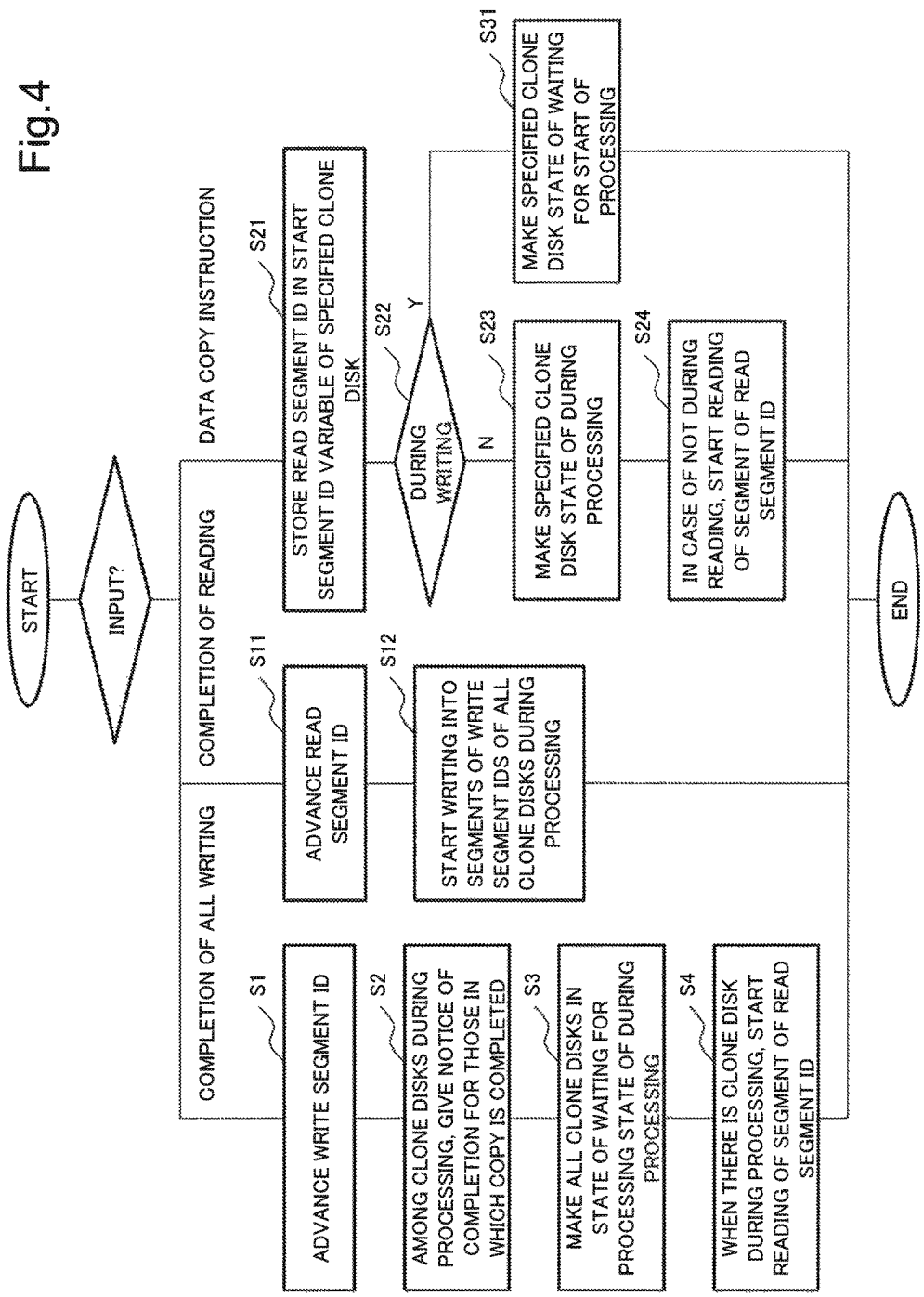
FIG. 4 is an operation flow chart of a clone processing unit 12.

<Operation>
FIG. 4 is an operation flow chart of the clone processing unit 12. The clone processing unit 12 is activated when receiving a data copy instruction from the management server device 30.

In other words, the management server device 30 (management device) transmits the copy instruction to the storage control device 10.

In the following description, the read segment ID is a value of the read segment ID variable, and other segment IDs follow this example.

When being activated, the clone processing unit 12 stores the read segment ID in the copy start segment ID variable associated with the clone disk device 21 specified by the copy request (S21). Then, during non-writing in the data copy process (N in S22), the clone processing unit 12 records "during processing" in the state variable associated with the clone disk device 21 (S23). Finally, in the case of no longer during reading of the master disk device 20, more specifically, in the case of not during reading for copy of another clone disk device 21, the clone processing unit 12 issues a reading instruction of the segment indicated by the read segment ID to the master disk device 20 (S24).

During writing in the data copy process (Y in S22), the clone processing unit 12 records "waiting for processing" in the state variable associated with the clone disk device 21 specified by the copy request (S31). This is because, when writing is already performed, copy of the clone disk device 21 is waited until copy of the next segment is started (S3, S4).

The clone processing unit 12 is activated also when reading of the master disk device 20 is completed, and advances the read segment ID to the next segment ID (S11). This advance is performed circularly, as described above.

Then, for segments of write segment IDs of all of the clone disk devices 21 associated with state variables indicating "during processing", the clone processing unit 12 starts writing of data for which reading is completed (S12).

The clone processing unit 12 is activated also when writing to all of the clone disk devices 21, which is started in S12, is completed, and advances the write segment ID to the next segment ID (S1). This advance is performed circularly, as described above.

Next, among the clone disk devices 21 in which the state variable value is "during processing", the clone processing unit 12 gives notice of completion for those in which copy is completed (S2). The clone processing unit 12 determines whether copy is completed, for example, determines that copy is completed with respect to a clone disk device 21 in which the copy start segment ID corresponds to the read segment ID. For each of the clone disk devices 21, the clone processing unit 12 counts the number of the segments in which copy is completed, and may determine that copy is completed with respect to a clone disk device 21 in which the number of the segments of the original data of the master disk device 20 corresponds to the number of the segments in which copy is completed.

When there is a clone disk device 21 in which the state variable value is "waiting for processing", the clone processing unit 12 changes the state variable value to "during processing" (S3). Finally, when there is a clone disk device 21 in which the associated state variable is "during processing", the clone processing unit 12 starts reading of the segment of the master disk device 20 indicated by the read segment ID (S4).

At the completion of reading data from the master disk device 20, the clone processing unit 12 may start writing of data of the segment in which reading is completed into the clone disk device 21 (S12) and start reading of data of the next segment simultaneously.

FIG. 5 to FIG. 9 are diagrams illustrating a process of executing copy with respect to three clone disk devices 21 (illustrated by clone disks 1, 2, and 3, respectively). In this example, the master disk device 20 stores data composed of three segments (illustrated by (1), (2), and (3), respectively). In this example, the copy start segment ID is illustrated as a start address of a copy segment, the read segment ID is illustrated as a read address, and the write segment ID is illustrated as a write address. Start addresses of copy start segments of the clone disks 1, 2, and 3 are illustrated as copy start addresses 1, 2, and 3.

In FIG. 5, when receiving a data-copy-request for the clone disk 1 first after starting of operation of the storage system 40, the clone processing unit 12 sets the read address to the copy start address of the clone disk 1. Here, the copy start address 1 becomes a start address of the segment (1). Then, the clone processing unit 12 starts to copy data of the segment (1) of the master disk indicated by the read address into the segment (1) of the clone disk 1 indicated by the write address 1.

Figure 6:
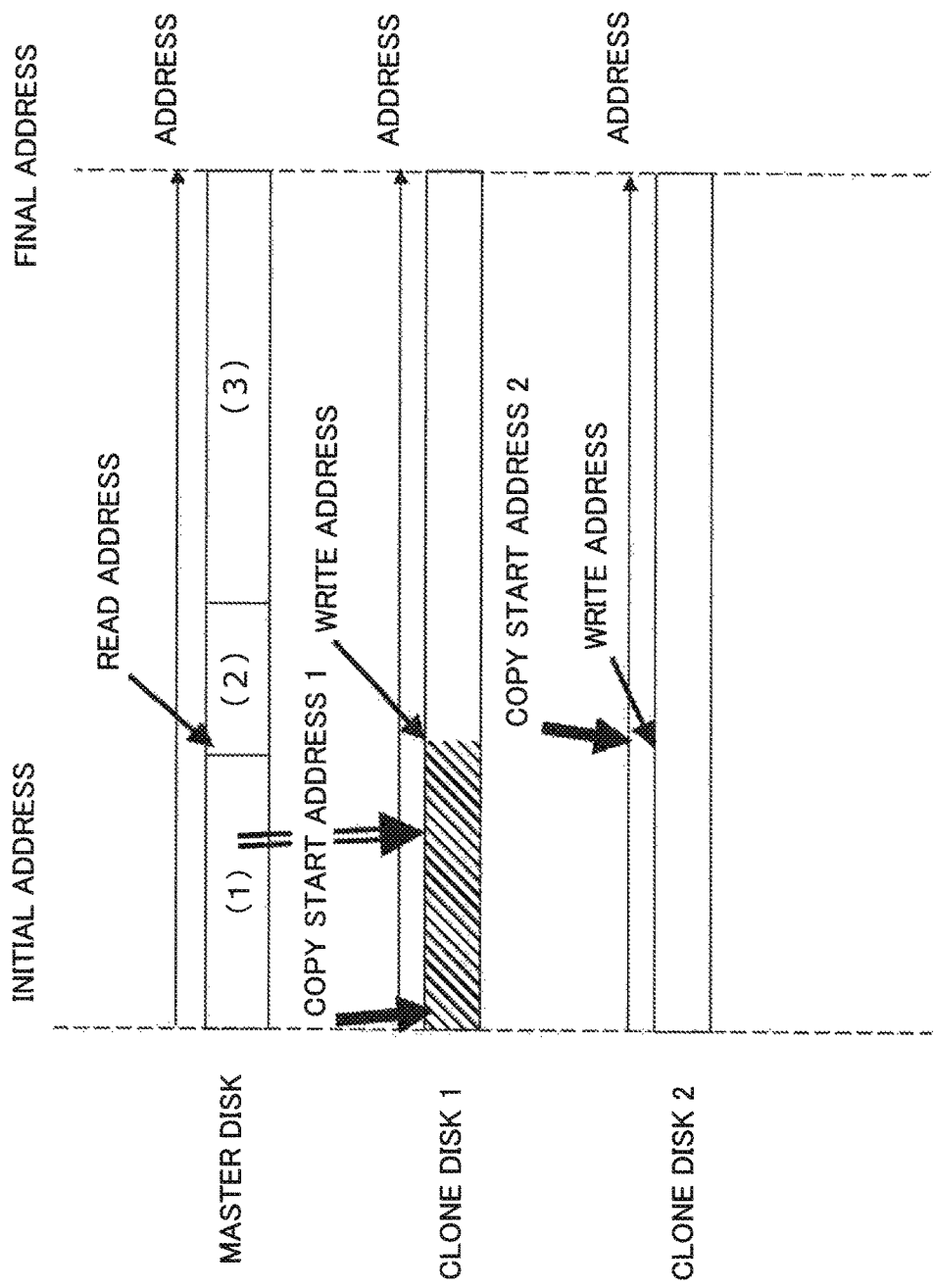
FIG. 6 is a diagram illustrating the process of executing copy with respect to the three clone disk devices 21 (illustrated by clone disks 1, 2, and 3, respectively) (part 2)

In FIG. 6, when receiving a data-copy-request for the clone disk 2 during writing into the segment (1) of the clone disk 1 (double-lined arrow in the drawing), the clone processing unit 12 sets the read address to the copy start address of the clone disk 2. Here, the copy start address 2 becomes a start address of the segment (2). After the completion of writing into the segment (1) of the clone disk 1, the clone processing unit 12 starts to copy data of the segment (2) of the master disk indicated by the read address into the segments (2) of the clone disks 1 and 2 indicated by the write addresses. At this time, copy into the segment (1) of the clone disk 1, which is hatched in the drawing, is completed.

Figure 7:
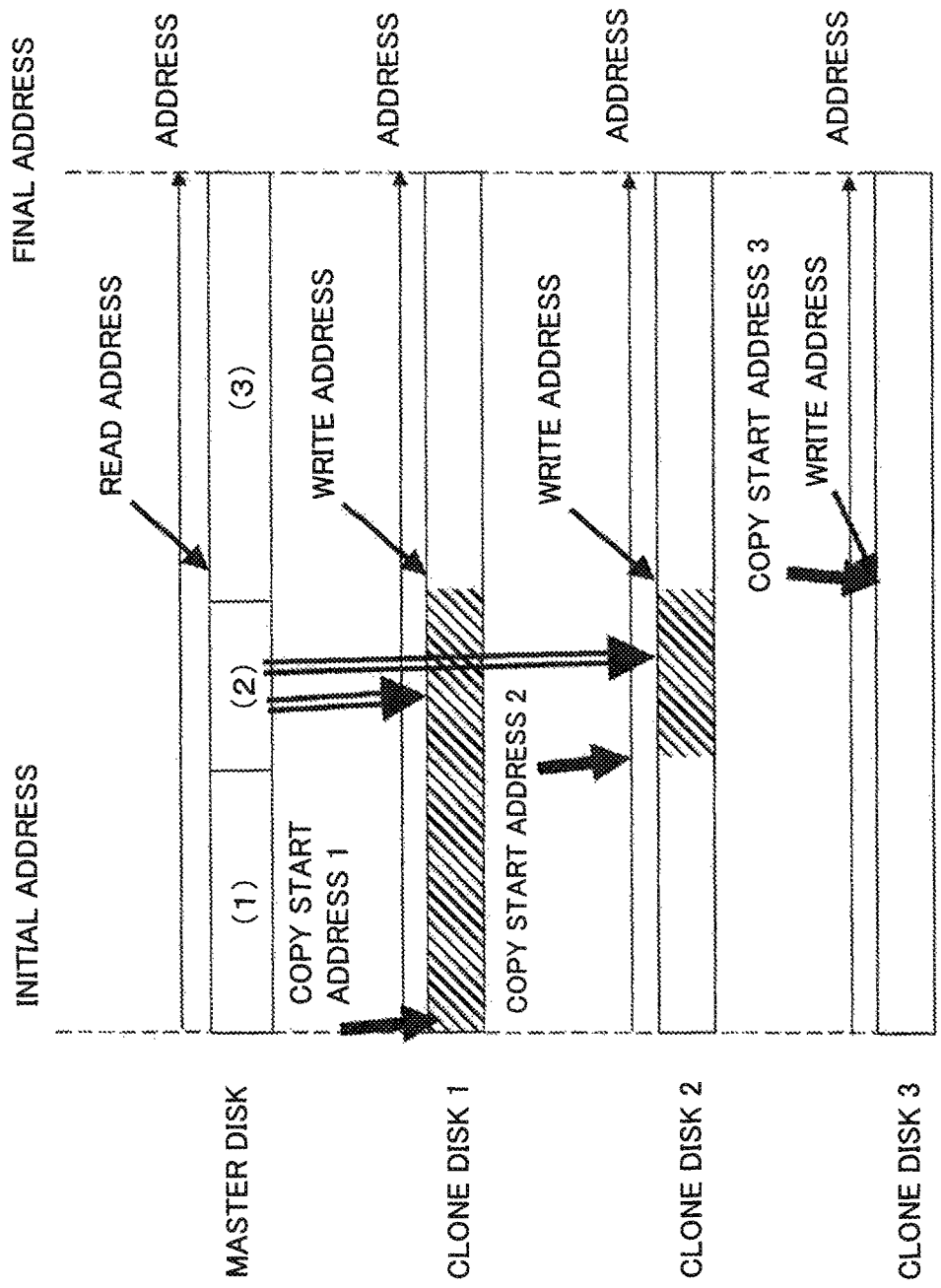
FIG. 7 is a diagram illustrating the process of executing copy with respect to the three clone disk devices 21 (illustrated by clone disks 1, 2, and 3, respectively) (part 3)

In FIG. 7, when receiving a data-copy-request for the clone disk 3 during writing into the segments (2) of the clone disks 1 and 2 (double-lined arrows in the drawing), the clone processing unit 12 sets the read address to the copy start address of the clone disk 3. Here, the copy start address 3 becomes a start address of the segment (3). After the completion of writing into the segments (2) of the clone disks 1 and 2, the clone processing unit 12 starts to copy data of the segment (3) of the master disk indicated by the read address into the segments (3) of the clone disks 1, 2, and 3 indicated by the write addresses. At this time, copies into the segment (1) and (2) of the clone disk 1 and the segment (2) of the clone disk 2, which are hatched in the drawing, are completed.

Figure 8:
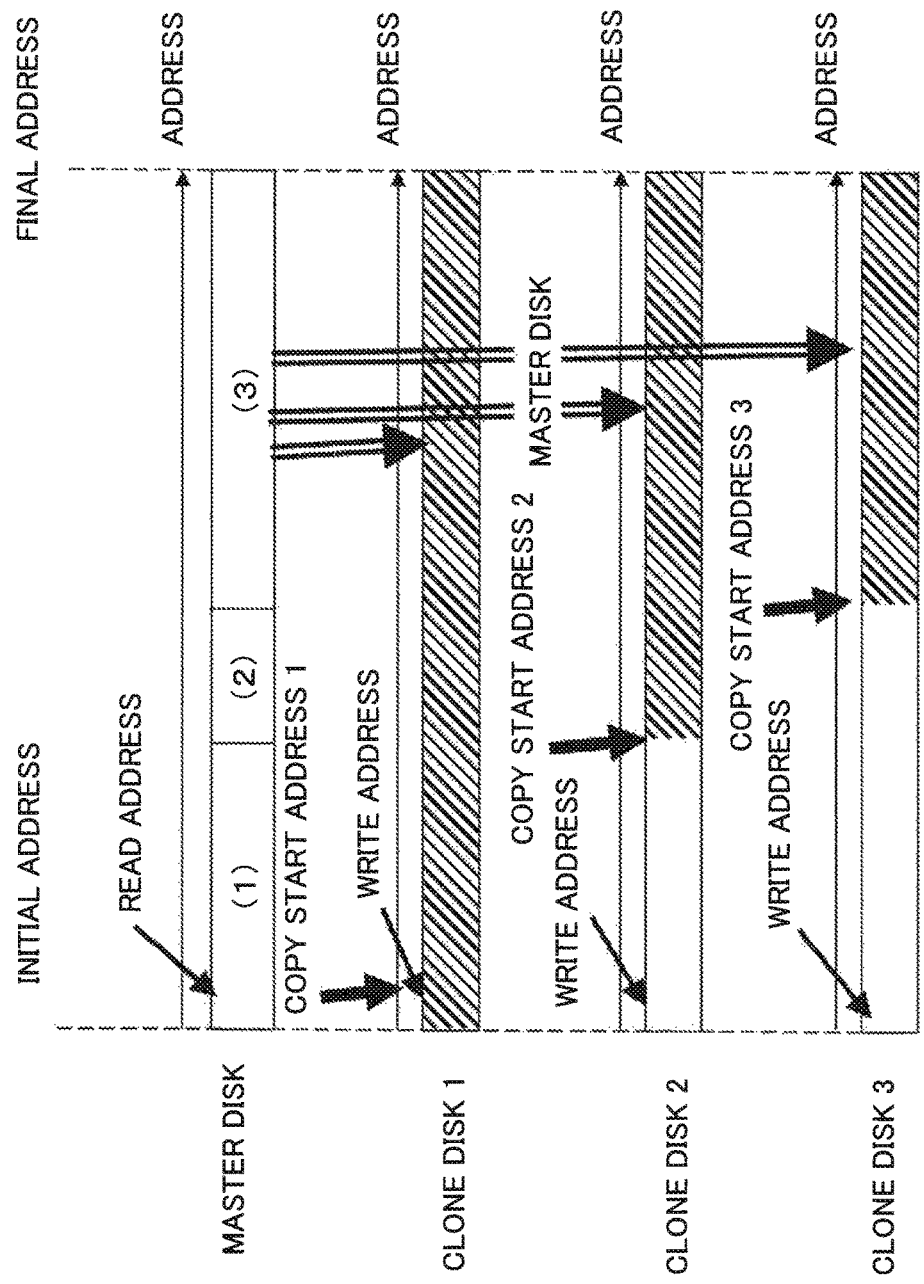
FIG. 8 is a diagram illustrating the process of executing copy with respect to the three clone disk devices 21 (illustrated by clone disks 1, 2, and 3, respectively) (part 4)

In FIG. 8, after the completion of writing into the segments (3) of the clone disks 1, 2, and 3 (double-lined arrows in the drawing), the clone processing unit 12 notifies the management server device 30 of copy completion of the clone disk 1 in which the copy start address 1 corresponds to the read address. Then, the clone processing unit 12 starts to copy data of the segment (1) of the master disk indicated by the read address into the segments (1) of the clone disks 2 and 3 indicated by the write addresses. At this time, copies into all of the segments of the clone disk 1, the segments (2) and (3) of the clone disk 2, and the segment (3) of the clone disk 3, which are hatched in the drawing, are completed.

Figure 9:
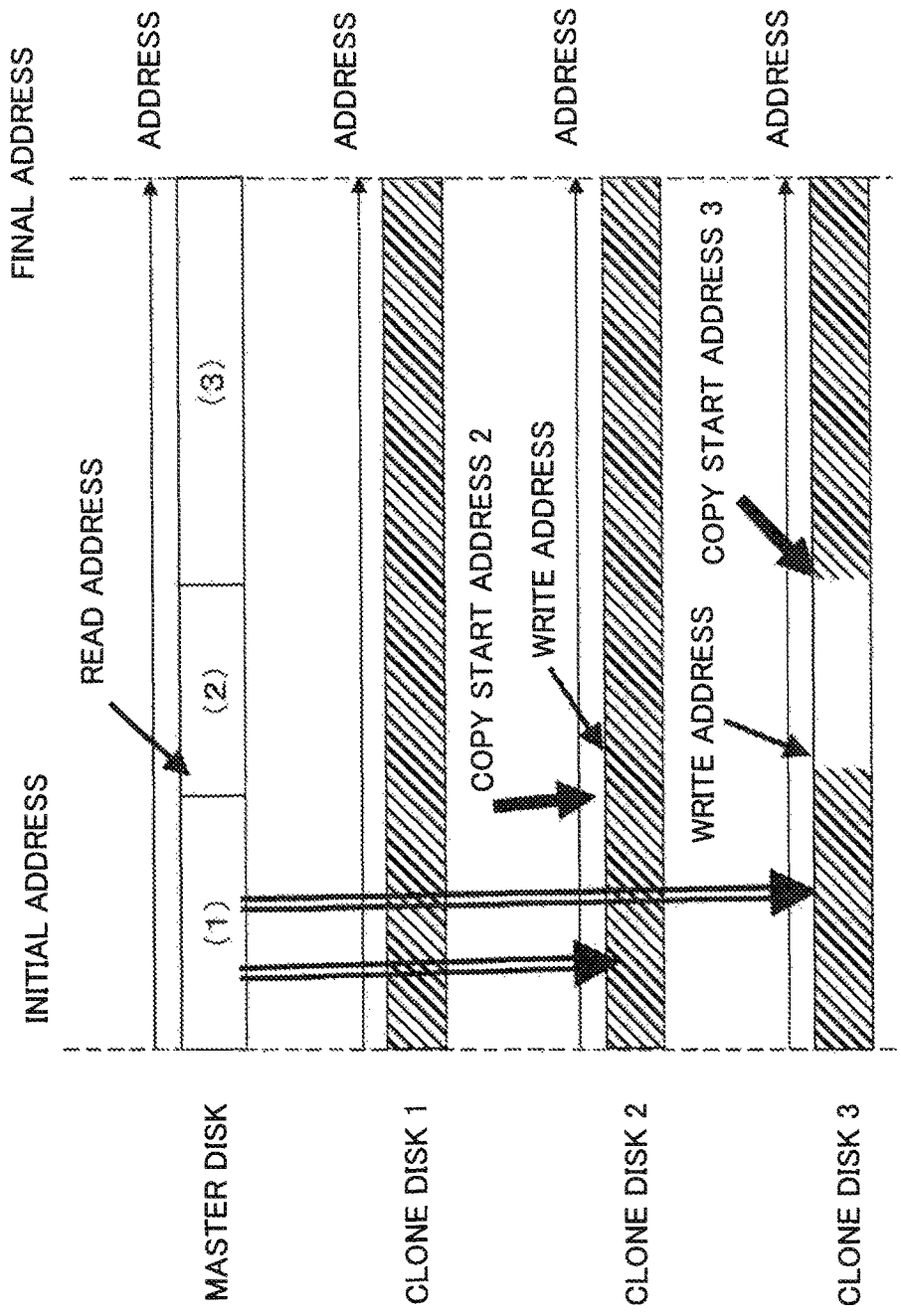
FIG. 9 is a diagram illustrating the process of executing copy with respect to the three clone disk devices 21 (illustrated by clone disks 1, 2, and 3, respectively) (part 5)

In FIG. 9, after the completion of writing into the segments (1) of the clone disks 2 and 3 (double-lined arrows in the drawing), the clone processing unit 12 notifies the management server device 30 of copy completion of the clone disk 2 in which the copy start address 2 corresponds to the read address. Then, the clone processing unit 12 starts to copy data of the segment (2) of the master disk indicated by the read address into the segment (2) of the clone disk 3 indicated by the write address. At this time, copies into all of the segments of the clone disks 1 and 2 and the segments (1) and (3) of the clone disk 3, which are hatched in the drawing, are completed.

Then, after the completion of writing into the segment (2) of the clone disk 3, the clone processing unit 12 notifies the management server device 30 of copy completion of the clone disk 3 in which the copy start address 3 corresponds to the read address, and finishes copy of the clone disks 1, 2, and 3.

<Effect>

The storage control device 10 according to the present example embodiment can perform copy at high speed even when copying data into the plurality of clone disk devices 21 from one master disk device 20 are executed a synchronously.

The first reason is that, when receiving a data-copy-request into a clone disk device 21, the clone processing unit 12 sets the write segment ID of the clone disk device 21 so as to perform data reading from the master disk device 20 by a sequential reading operation. Accordingly, seek operation of the master disk device 20 is effectively performed.

The second reason is that the clone processing unit 12 can write data, read one time from the master disk device 20, into the plurality of clone disk devices 21. More specifically, the clone processing unit 12 need not read data from the master disk device 20 each time, with respect to each of the clone disk devices 21 that are targets to be copied.

Accordingly, the storage control device 10 can perform copy at high speed by reducing the load of data read of the master disk device 20.

<Second Example Embodiment>

Figure 10:
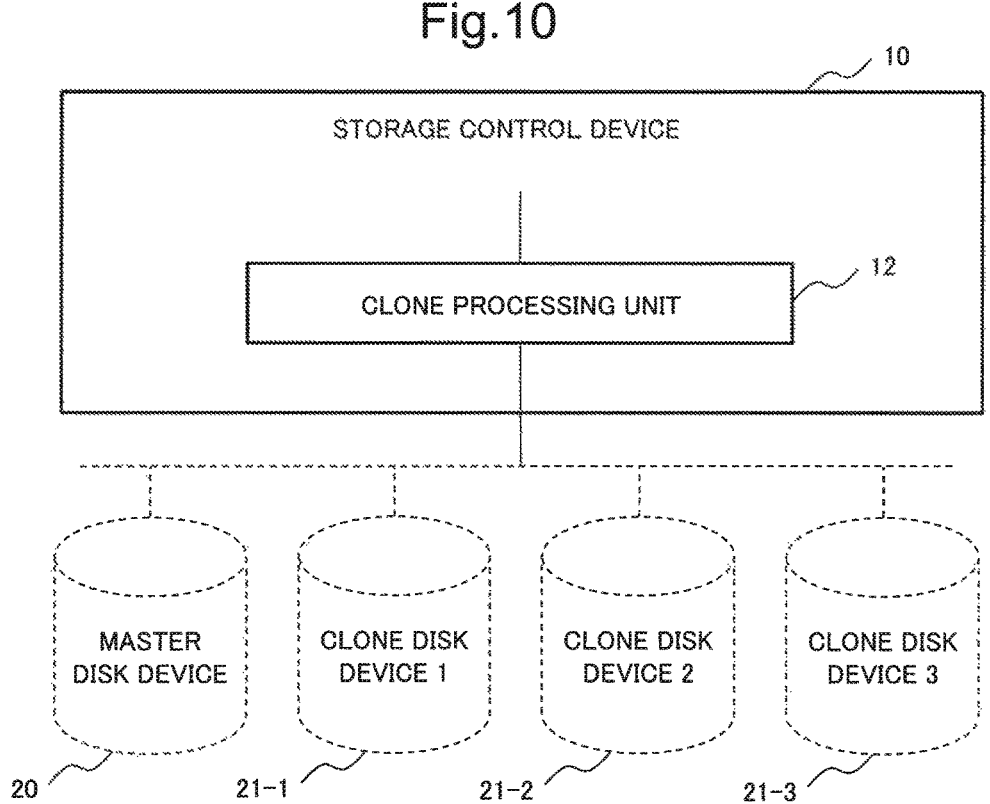
FIG. 10 is a configuration diagram of a storage control device 10 according to a second example embodiment.

FIG. 10 is a configuration diagram of the storage control device 10 according to a second example embodiment.

The storage control device 10 is connected to the master disk device 20 that stores data into a plurality of segments continuously, and the plurality of clone disk devices 21 that are copy destinations of the data.

The storage control device 10 includes the clone processing unit 12 that, when receiving a copy instruction for any one of the clone disk devices 21, repeats reading and writing of each of the segments in order of address to complete copy. When a first copy disk, that is a copy disk device other than a later copy disk that is the specified clone disk device 21, is during copy when receiving the copy instruction, the clone processing unit 12 starts copy of the later copy disk device from the segment during reading, and, after the completion of reading data of the segment, performs writing into both the first copy disk and the later copy disk.

The storage control device 10 according to the present example embodiment can perform copy at high speed even when copying data into the plurality of clone disk devices 21 from one master disk device 20 are executed a synchronously.

The first reason is that, when receiving a data-copy-request to a clone disk device 21, the clone processing unit 12 sets the write segment ID of the clone disk device 21 so as to perform data reading from the master disk device 20 by a sequential reading operation. Accordingly, seek operation of the master disk device 20 is effectively performed.

The second reason is that the clone processing unit 12 can write data read one time from the master disk device 20 into the plurality of clone disk devices 21. More specifically, the clone processing unit 12 need not read data from the master disk device 20 each time, with respect to each of the clone disk devices 21 that are targets to be copied.

Accordingly, the storage control device 10 can perform copy at high speed by reducing the load of data read of the master disk device 20.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

The whole or part of the example embodiments disclosed above can be described as, but not limited to, the following supplementary notes.

(Supplementary Note 1)

A storage control device connected to a master disk device that stores data into a plurality of segments continuously, and a plurality of copy disk devices that are copy destinations of the data, the storage control device includes:

a clone processing unit that, when receiving a copy instruction for one of the copy disk devices, repeats reading and writing of each of the segments in order of address to complete copy, and that, when a first copy disk that is the copy disk device other than a later copy disk that is the specified copy disk device is during copy when receiving the copy instruction, starts copy of the later copy disk from the segment during reading, and, after the completion of reading data of the segment, performs writing into both the first copy disk and the later copy disk.

(Supplementary Note 2)

The storage control device according to supplementary note 1, wherein the clone processing unit (1) continues reading and writing of the segments in order of circular address such that the segment having the lowest address is targeted after the segment having the highest address, as long as there is the copy disk device during copy, and (2) gives notice of completion for the copy disk device in which copy of all of the segments is completed.

(Supplementary Note 3)

The storage control device according to supplementary note 2, further includes:

a storage region in a management table storing a read segment ID variable that stores a segment ID that is an identifier of the segment during reading, a write segment ID variable that stores the segment ID during writing, and a copy start segment ID variable that stores the segment ID where copy is started with respect to each of the copy disk devices during copy, during reading the master disk device, wherein the clone processing unit (1) stores, when receiving the copy instruction during reading the master disk device, a value of the read segment ID variable in the copy start segment ID variable of the copy disk device specified by the copy instruction, (2) when reading of the master disk device is completed,
  (a) advances the value of the read segment ID variable to the next segment ID in order of the circular address,
  (b) starts writing of the read data into the segments indicated by the write segment ID variable of all of the copy disk devices during copy, (3) when writing of all of the copy disk devices is completed,
  (a) advances a value of the write segment ID variable to the next segment ID in order of the circular address,
  (b) among the copy disk devices during copy, determines those in which copy of all segments is completed on the basis of the copy start segment ID variable, and gives notice of completion, and,
  (c) when there is the copy disk device during copy, starts reading from the segment indicated by the read segment ID variable of the master disk device.

(Supplementary Note 4)

The storage control device according to any one on supplementary notes 1 to 3, wherein each of the segment IDs is a start address of the segments or a sequence number.

(Supplementary Note 5)

A storage system including:

the storage control device of any one of supplementary notes 1 to 4;

a management device that transmits the copy instruction to the storage control device and receives the notice of completion;

the master disk device; and the plurality of copy disk devices.

(Supplementary Note 6)

A storage control method of a storage control device connected to a master disk device that stores data into a plurality of segments continuously, and a plurality of copy disk devices that are copy destinations of the data, the storage control method includes:

by the storage control device, receiving a copy instruction for one of the copy disk devices, and repeating reading and writing of each of the segments in order of address to complete copy; and when a first copy disk that is the copy disk device other than a later copy disk that is the specified copy disk device is during copy when receiving the copy instruction, starting copy of the later copy disk from the segment during reading, and, after the completion of reading data of the segment, performing writing into both the first copy disk and the later copy disk.

(Supplementary Note 7)

The storage control method according to supplementary note 6, further includes:

by the storage control device, (1) continuing reading and writing of the segments in order of circular address such that the segment having the lowest address is targeted after the segment having the highest address, as long as there is the copy disk device during copy, and (2) giving notice of completion for the copy disk device in which copy of all of the segments is completed.

(Supplementary Note 8)

The storage control method according to supplementary note 7, further includes:

with the use of a storage region in a management table storing a read segment ID variable that stores a segment ID that is an identifier of the segment during reading, a write segment ID variable that stores the segment ID during writing, and a copy start segment ID variable that stores the segment ID where copy is started with respect to each of the copy disk devices during copy, during reading the master disk device, by the storage control device, (1) storing, when receiving the copy instruction during reading the master disk device, a value of the read segment ID variable in the copy start segment ID variable of the copy disk device specified by the copy instruction, (2) when reading of the master disk device is completed, (a) advancing the value of the read segment ID variable to the next segment ID in order of the circular address, (b) starting writing of the read data into the segments indicated by the write segment ID variable of all of the copy disk devices during copy, (3) when writing of all of the copy disk devices is completed, (a) advancing a value of the write segment ID variable to the next segment ID in order of the circular address, (b) among the copy disk devices during copy, determining those in which copy of all segments is completed on the basis of the copy start segment ID variable, and giving notice of completion, and, (c) when there is the copy disk device during copy, starting reading from the segment indicated by the read segment ID variable of the master disk device.

(Supplementary note 9)

A computer readable non-transitory recording medium embodying a program, the program causing a computer to perform a method, the computer connected to a master disk device that stores data into a plurality of segments continuously, and a plurality of copy disk devices that are copy destinations of the data, the method includes:

receiving a copy instruction for one of the copy disk devices, and repeating reading and writing of each of the segments in order of address to complete copy, and, when a first copy disk that is the copy disk device other than a later copy disk that is the specified copy disk device is during copy when receiving the copy instruction, starting copy of the later copy disk from the segment during reading, and, after the completion of reading data of the segment, performing writing into both the first copy disk and the later copy disk.

(Supplementary Note 10)

The method performed by the computer caused by the program embodied in the computer readable non-transitory recording medium according to supplementary note 9, the method further includes:

(1) continuing reading and writing of the segments in order of circular address such that the segment having the lowest address is targeted after the segment having the highest address, as long as there is the copy disk device during copy, and (2) giving notice of completion for the copy disk device in which copy of all of the segments is completed.

What is claimed is:

1. A storage control device connected to a master disk device that stores data and a plurality of clone disk devices to which the same data is copied from the master disk device, the storage control device comprising:

at least one memory configured to store instructions;

at least one processor configured to execute the instructions to perform reading the data from the master disk and writing the same data to each of the plurality of the clone disks; and a management table storing:

a read address indicating a reading segment of the master disk device from which the data is currently read, a write address indicating a writing segment of each of the plurality of the clone disk devices into which the same data is currently written, and a copy-start address indicating a copy-start segment of each of the plurality of the clone disk devices from which writing the same data is started, wherein when receiving data-copy requests into the plurality of clone disk devices asynchronously, the at least one processor executes the instructions to perform:

reading the data from the master disk, writing the same data to each of the plurality of the clone disks in order of segmentation of each of the plurality of the clone disks from the copy-start segment, recording the copy-start address indicating the copy-start segment, after completion of the writing into final segments of the plurality of clone disk devices, proceeding back to first segments of the plurality of clone disk devices, and continuing the writing the data in order of the segmentation until completion of the writing the data to a previous segment of the copy-start segment indicated by the copy-start address.

2. A non-transitory computer-readable data storage medium storing instructions executable by a storage control device to perform a method, the storage control device connected to a master disk device that stores data and a plurality of clone disk devices to which the same data is copied from the master disk, the method for performing reading the data from the master disk and writing the same data to each of the plurality of the clone disks, the method comprising:

maintaining a management table storing a read address indicating a reading segment of the master disk device from which the data is currently read, a write address indicating a writing segment of each of the plurality of the clone disk devices into which the same data is currently written, and a copy-start address indicating a copy-start segment of each of the plurality of the clone disk devices from which writing the same data is started;

when receiving data-copy requests into the plurality of clone disk devices asynchronously:

reading the data from the master disk;

writing the same data to each of the plurality of the clone disks in order of segmentation of each of the plurality of the clone disks from the copy-start segment;

recording the copy-start address indicating the copy-start segment;

after completion of the writing into final segments of the plurality of clone disk devices, proceeding back to first segments of the plurality of clone disk devices; and continuing the writing the data in order of the segmentation until completion of the writing the data to a previous segment of the copy-start segment indicated by the copy-start address.

3. A method performable by a storage control device connected to a master disk device that stores data and a plurality of clone disk devices to which the same data is copied from the master disk device, the method for performing reading the data from the master disk and writing the same data to each of the plurality of the clone disks, the method comprising:

maintaining a management table storing a read address indicating a reading segment of the master disk device from which the data is currently read, a write address indicating a writing segment of each of the plurality of the clone disk devices into which the same data is currently written, and a copy-start address indicating a copy-start segment from which writing the same data is started;

when receiving data-copy requests into the plurality of clone disk devices asynchronously:

reading the data from the master disk;

writing the same data to each of the plurality of the clone disks in order of segmentation of each of the plurality of the clone disks from the copy-start segment;

recording the copy-start address indicating the copy-start segment;

after the completion of the writing into final segments of the plurality of clone disk devices, proceeding back to first segments of the plurality of clone disk devices; and continuing the writing the data in order of the segmentation until completion of the writing the data to a previous segment of the copy-start segment indicated by the copy-start address.

\* \* \* \* \*